United States Patent
Neddermeyer, III et al.

(10) Patent No.: US 8,827,017 B2
(45) Date of Patent: Sep. 9, 2014

(54) VEHICLE OR ENVIRONMENT-CONTROLLED UNIT HAVING A MULTIPHASE ALTERNATOR WITH A PROTECTED HIGH-VOLTAGE BUS

(75) Inventors: Robert N. Neddermeyer, III, Eagan, MN (US); Gregory R. Truckenbrod, Minneapolis, MN (US); Matthew S. Nelson, Cottage Grove, MN (US); Ashok Muralidhar, Eagan, MN (US); Christopher P. Henze, Lakeville, MN (US)

(73) Assignee: Thermo King Corporation, Minneapolis, MN (US)

( * ) Notice: Subject to any disclaimer, the term of this patent is extended or adjusted under 35 U.S.C. 154(b) by 160 days.

(21) Appl. No.: 13/435,816

(22) Filed: Mar. 30, 2012

(65) Prior Publication Data

US 2013/0255910 A1 Oct. 3, 2013

(51) Int. Cl.
B60W 10/04 (2006.01)

(52) U.S. Cl.
USPC ............................. 180/65.285; 322/28; 322/8

(58) Field of Classification Search
USPC ........... 180/65.1–65.31; 902/903–907; 322/8, 322/28–30, 90
See application file for complete search history.

(56) References Cited

U.S. PATENT DOCUMENTS

| | | |
|---|---|---|
| 4,151,460 A | 4/1979 | Seese et al. |
| 4,345,288 A | 8/1982 | Kampf et al. |
| 4,346,307 A | 8/1982 | Zulaski |
| 4,398,232 A | 8/1983 | Elmore |
| 4,542,468 A | 9/1985 | Taniguti |
| 4,607,309 A | 8/1986 | Bishop |
| 4,878,142 A | 10/1989 | Bergman et al. |
| 4,879,625 A | 11/1989 | Potenzone |
| 5,731,690 A * | 3/1998 | Taniquchi et al. .............. 322/28 |
| 6,154,036 A | 11/2000 | Baldwin |
| 6,320,731 B1 | 11/2001 | Eaves et al. |
| 6,573,726 B1 | 6/2003 | Roberts et al. |
| 6,888,708 B2 | 5/2005 | Brungs et al. |
| 6,941,233 B2 | 9/2005 | Ennis |
| 7,050,279 B2 | 5/2006 | Nojima |
| 7,180,300 B2 | 2/2007 | Premerlani et al. |
| 7,254,004 B2 | 8/2007 | Mladenik et al. |

(Continued)

FOREIGN PATENT DOCUMENTS

| | | |
|---|---|---|
| JP | 06026746 | 2/1994 |
| JP | 06260308 | 9/1994 |
| JP | 09233687 | 9/1997 |
| KR | 200600077841 | 1/2006 |

OTHER PUBLICATIONS

International Search Report and Written Opinion for Application No. PCT/US2013/031194 dated Jun. 12, 2013 (10 pages).

*Primary Examiner* — John Walters
*Assistant Examiner* — James Triggs
(74) *Attorney, Agent, or Firm* — Hamre, Schumann, Mueller & Larson, P.C.

(57) ABSTRACT

A mobile environment-controlled unit, such as an over-the-road compartment trailer, having an environmental-control system, such as a refrigeration unit, powered by an alternator and having a high-voltage alternating current (AC) bus. The unit incorporates a high resistance ground scheme and can incorporate a solid-state input module to detect phase-chassis faults. This combination provides an improvement in protection for mobile applications that cannot have a voltage reference (or neutral point) solidly connected to earth ground.

15 Claims, 4 Drawing Sheets

(56) References Cited

U.S. PATENT DOCUMENTS

| | | |
|---|---|---|
| 7,301,739 B2 | 11/2007 | Hamer |
| 7,719,285 B2 | 5/2010 | Johansson et al. |
| 7,894,169 B2 | 2/2011 | Valdez et al. |
| 7,965,478 B2 | 6/2011 | Haensgen et al. |
| 2007/0042854 A1* | 2/2007 | Edelson .................. 475/149 |
| 2010/0014198 A1 | 1/2010 | Dusang, Jr. et al. |
| 2010/0213952 A1 | 8/2010 | Locker |

* cited by examiner

VEHICLE OR ENVIRONMENT-CONTROLLED UNIT HAVING A MULTIPHASE ALTERNATOR WITH A PROTECTED HIGH-VOLTAGE BUS

BACKGROUND

Embodiments of the invention relate to a mobile environment-controlled unit, such as an over-the-road compartment trailer, having an environmental-control system, such as a refrigeration unit, powered by an alternator and having a high-voltage alternating current (AC) bus. Other embodiments of the invention relate to a vehicle having an alternator and a high-voltage AC bus.

Stationary high-voltage applications typically include a grounding and protection scheme. However, mobile high-voltage applications cannot rely on the same grounding and protection schemes as stationary high-voltage applications.

One scheme for a mobile high-voltage application is an open-circuit neutral-chassis connection to limit fault current. However, this scheme fails to limit voltage spikes during intermittent phase-chassis faults, which can damage equipment and lead to cascading failures.

Another scheme for a mobile high-voltage application is a short-circuit neutral-chassis connection. However, this scheme provides insignificant protection unless incorporated with a ground fault current interrupter (GFCI or GFI) device. This scheme is somewhat imprecise to implement, and can lead to either nuisance trips (affecting reliability) or imprecise thresholds (leading to potential personnel safety).

SUMMARY

In one embodiment of the invention, a high-voltage AC bus from a multi-phase alternator incorporates both a high resistance ground scheme and a solid-state input module to detect phase-chassis faults in the system. This combination provides an improvement in protection for mobile applications that cannot have a voltage reference (or neutral point) solidly connected to earth ground.

In another embodiment, the invention provides a mobile environment-controlled unit having a chassis, a compartment supported by the chassis, and an environmental-control system supported by the chassis and in environmental communication with the compartment. The environmental-control system is configured to control an environmental parameter of the compartment. The environmental-control system includes a multiphase alternator powered by an internal combustion engine and to supply electrical power for the environmental-control system. The alternator has phase windings and a neutral point for the phase windings. The environmental-control system further includes a high-resistance resistor electrically coupling the neutral point for the phase windings to the chassis.

In yet another embodiment, the environmental control system further includes a solid-state module electrically coupling the neutral point for the phase windings to the chassis. The module is configured to monitor a voltage from the neutral point for the phase windings to the system chassis, and to provide an output when the monitored voltage indicates a possible phase-to-structure fault.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one implementation, a mobile unit (e.g., a vehicle or a mobile environment-controlled unit) has a multiphase alternator (e.g., a three-phase alternator). The unit incorporates two separate aspects for creating a safe and reliable grounding scheme for the high voltage bus of the unit. The first aspect incorporates a high resistance ground (HRG) resistance between the neutral point of the alternator, which develops the high voltage AC, and the unit's chassis. The HRG includes a resistance value selected in a high resistance value range, which is set to sufficiently limit current in a phase-to-chassis fault event, while not being so high to not dissipate parasitic current during an intermittent phase-to-chassis fault. The HRG allows the system to operate during a fault, and protects against cascading failures. Alternatively, a low resistance ground (LRG) scheme is feasible, though it is more difficult to implement due to higher current ratings required for equipment.

The second aspect is a solid-state input module monitoring the voltage between the neutral point of the alternator and the system chassis. For example, the generator neutral point may be the terminal on a wye-point protector device; however, alternate connection points are applicable. During a phase-to-chassis fault, neutral-chassis voltage rises to match the alternator's phase-neutral voltage. This voltage rise energizes the solid-state module, thereby generating a fault condition.

Figure 1:
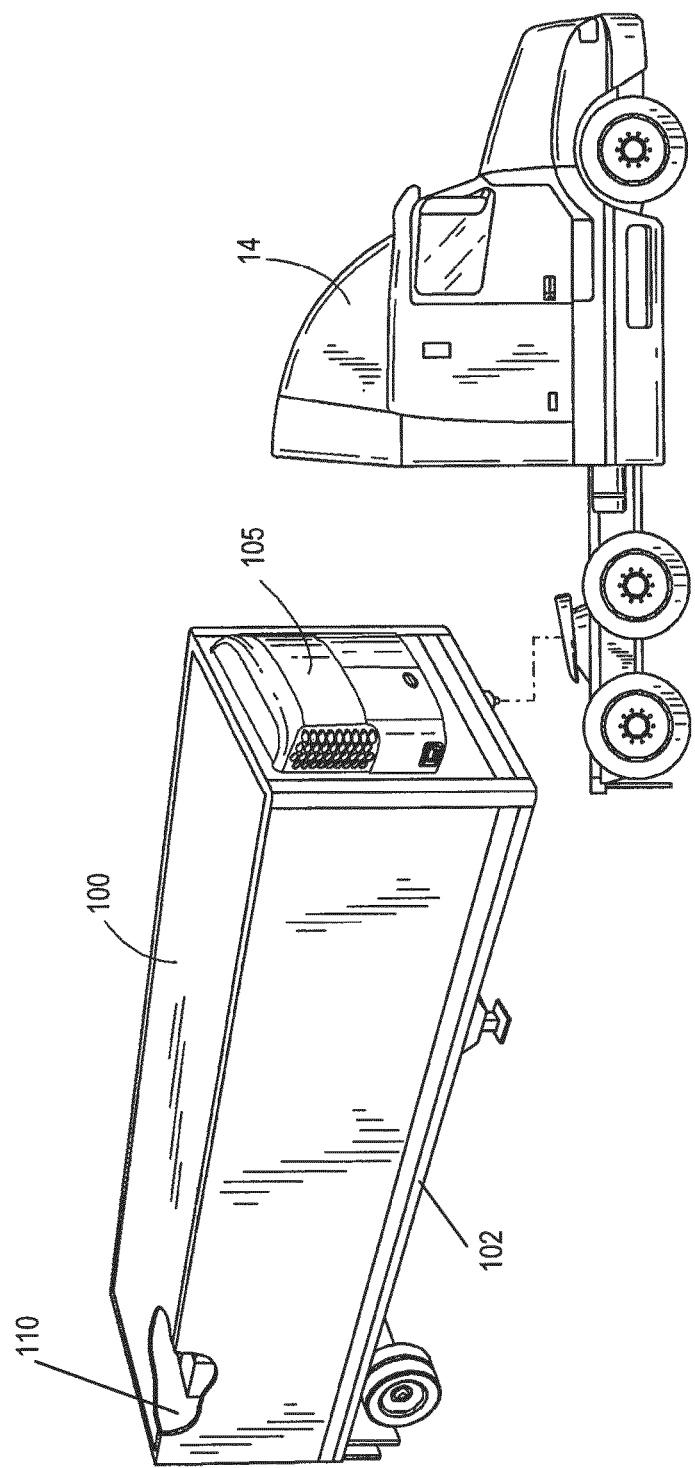
FIG. 1 is a perspective view of an over-the-road tractor and semi trailer.

Embodiments of the invention relate to a mobile environment-controlled unit having an environmental-control system and a compartment. Exemplary mobile environment-controlled units include an over-the-road trailer, over-the-road truck body, bus, transport container, and railway car. The compartment can take the form of multiple compartments or have multiple zones. An exemplary environmental-control system includes one or more of a refrigeration system, heating system, humidity system, and air-quality system. An even more specific exemplarily system includes a heating, ventilating, air conditioning, and refrigeration (HVACR) system. In the specific example discussed below, the environment-controlled unit is an over-the-road refrigerated semi trailer 100 (FIG. 1) having a chassis 102 supporting (or forming) a single compartment 110 cooled by a refrigeration unit 105. The chassis 102 also supports the refrigeration unit 105. Other embodiments of the invention relate to a vehicle having an alternator and a high-voltage AC bus. Exemplary vehicles include automobile, marine, and aerospace vehicles.

Figure 2:
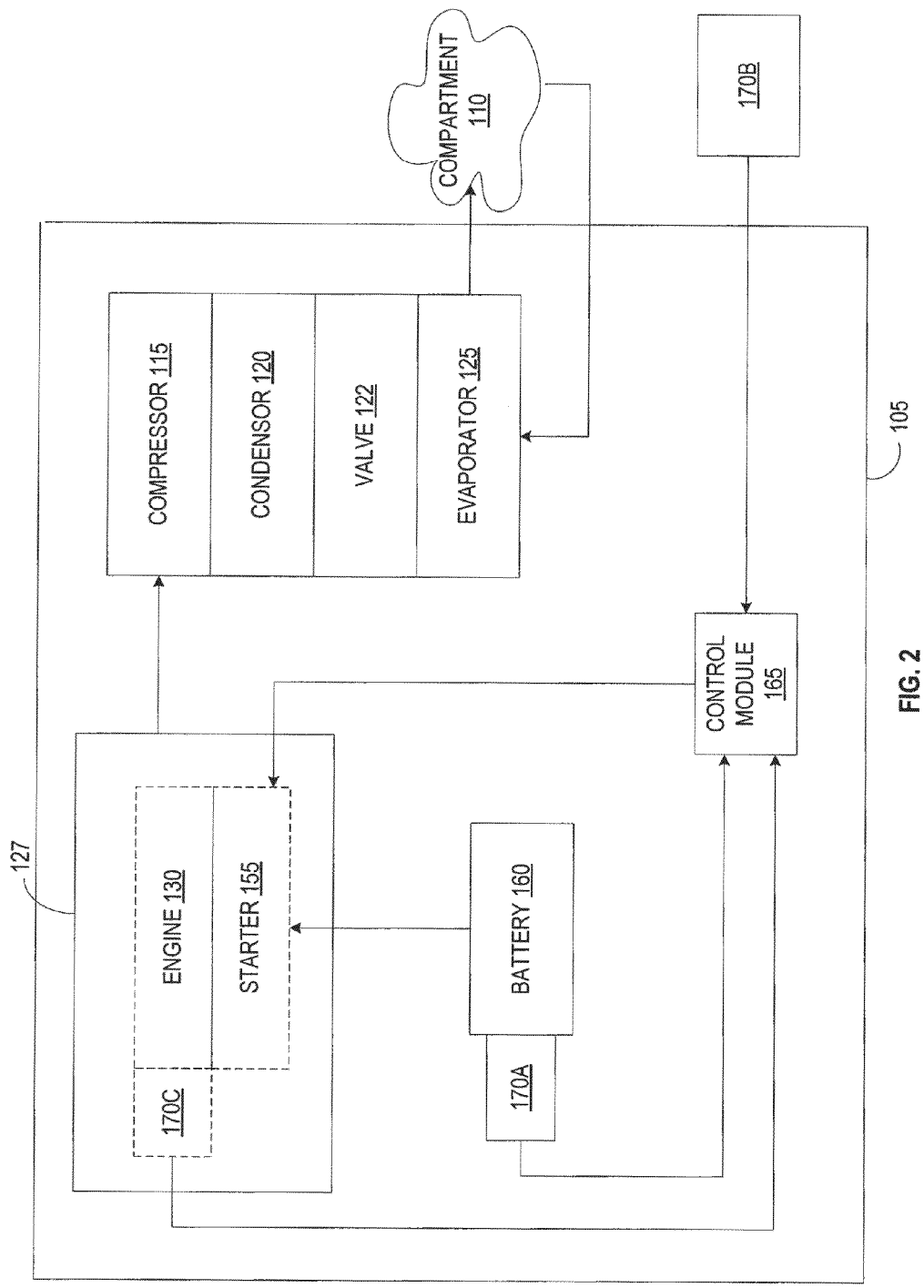
FIG. 2 is a block diagram of a refrigeration unit of the semi trailer of FIG. 1.

The refrigeration unit 105 of the specific example herein includes conventional refrigeration elements, such as a compressor 115 (FIG. 2), condenser 120, expansion valve 122, and evaporator 125. The refrigeration unit 105 is powered from an internal combustion engine 130. For example, in the construction shown in FIG. 2, the compressor includes a motor driven by a built-driven alternator 127 having a governed internal combustion engine 130.

For the described construction, the refrigeration unit 105 is controlled in a "cycle" mode, which starts the engine 130 when a parameter is out of range and stops the engine 130 when the parameter is within range. The parameter may be, for example, battery voltage, compartment temperature, compartment humidity, compartment air quality, or engine temperature. In one specific example, the engine 130 starts after the compartment temperature rises above a first temperature value and stops after the compartment temperature falls below a second temperature value, which may be the same as the first temperature value.

Referring again to FIG. 2, a starter 155 is powered by a battery 160 and is controlled in response to a signal from a control module 165. The control module 165 also receives a signal from a sensor 170. The signal 170 has a value having a relation to a sensed parameter. For example, the sensor 170A can be a voltage sensor and the signal has a relation to the voltage of the battery 160. As another example, the sensor 170B can be a temperature sensor and the signal has a relation to the temperature of the compartment 110. In another example, the sensor 170C can sense an electrical parameter of, or provided by, the alternator 127.

Before proceeding further, it should be understood that while the control module 165 is discussed herein as a single module the control module can comprise multiple modules.

Figure 3:
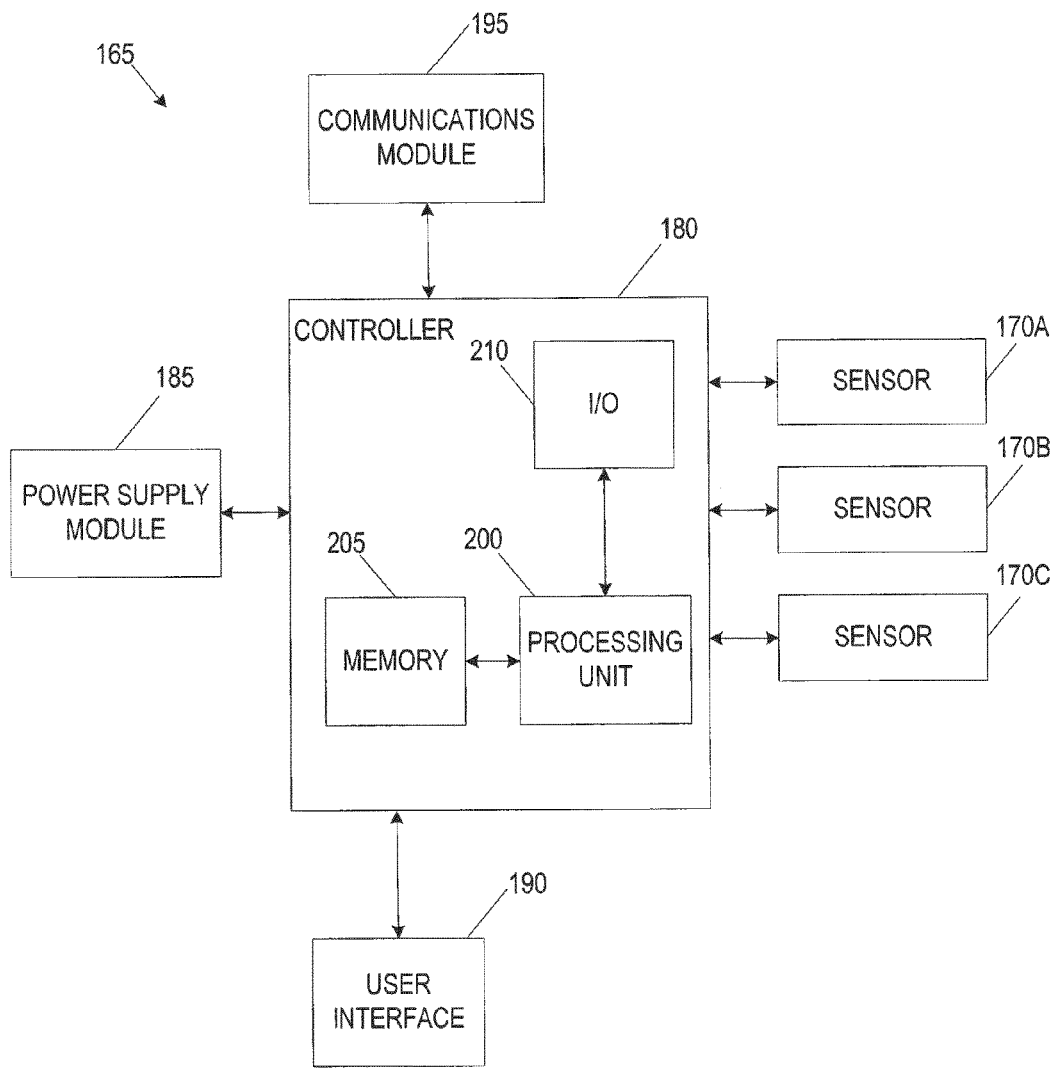
FIG. 3 is a block diagram of a control module of the refrigeration of FIG. 2.

The control module 165 includes, among other things, a controller 180 (FIG. 3), a power supply module 185, a user interface 190, and a communications module 195. The controller 180 includes combinations of software and hardware that are operable to, among other things, control the operation of the refrigeration unit 105. In one construction, the controller 180 includes a printed circuit board ("PCB") that is populated with a plurality of electrical and electronic components that provide power, operational control, and protection to the control module 165. In some constructions, the PCB includes, for example, a processing unit 200 (e.g., a microprocessor, a microcontroller, digital signal processor, or another suitable programmable device), a memory 205, and a bus. The bus connects various components of the PCB, including the memory 205 to the processing unit 200. The memory 205 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 200 is connected to the memory 205 and executes software that is capable of being stored in the RAM (e.g., during execution), the ROM (e.g., on a generally permanent basis), or another non-transitory computer readable medium such as another memory or a disc. Additionally or alternatively, the memory 205 is included in the processing unit 200. The controller 180 also includes an input/output ("I/O") system 210 that includes routines for transferring information between components within the controller 180 and other components of the control module 165. For example, the communications module 195 is configured to provide communication between the control module 180 and one or more additional devices within the trailer 100 or tractor 14 or external to the trailer 100 or tractor 14.

Software included in the implementation of the control module 165 is stored in the memory 205 of the controller 180. The software includes, for example, firmware, one or more applications, program data, one or more program modules, and other executable instructions. The controller 180 is configured to retrieve from memory and execute, among other things, instructions related to the operation and control of the refrigeration unit 105. For example, the controller 180 is configured to execute instructions retrieved from memory 205 for monitoring the temperature within the compartment 110 and for controlling the refrigeration unit 105 to control the temperature within the compartment 110. In other constructions, the controller 180 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 180.

The user interface 190 is included to control the control module 165 or the operation of the refrigeration unit 105 as a whole. The user interface 190 is operably coupled to the controller 180 to control, for example, setting the operation of the refrigeration unit 105 and communicating faults of the refrigeration unit 105. The user interface 190 can include combinations of digital and analog input/output devices required to achieve a desired level of interfacing with an operator. For example, the user interface 190 can include a computing device having a display and input devices, a touch-screen display, a plurality of knobs, dials, switches, buttons, faders, or the like.

Figure 4:
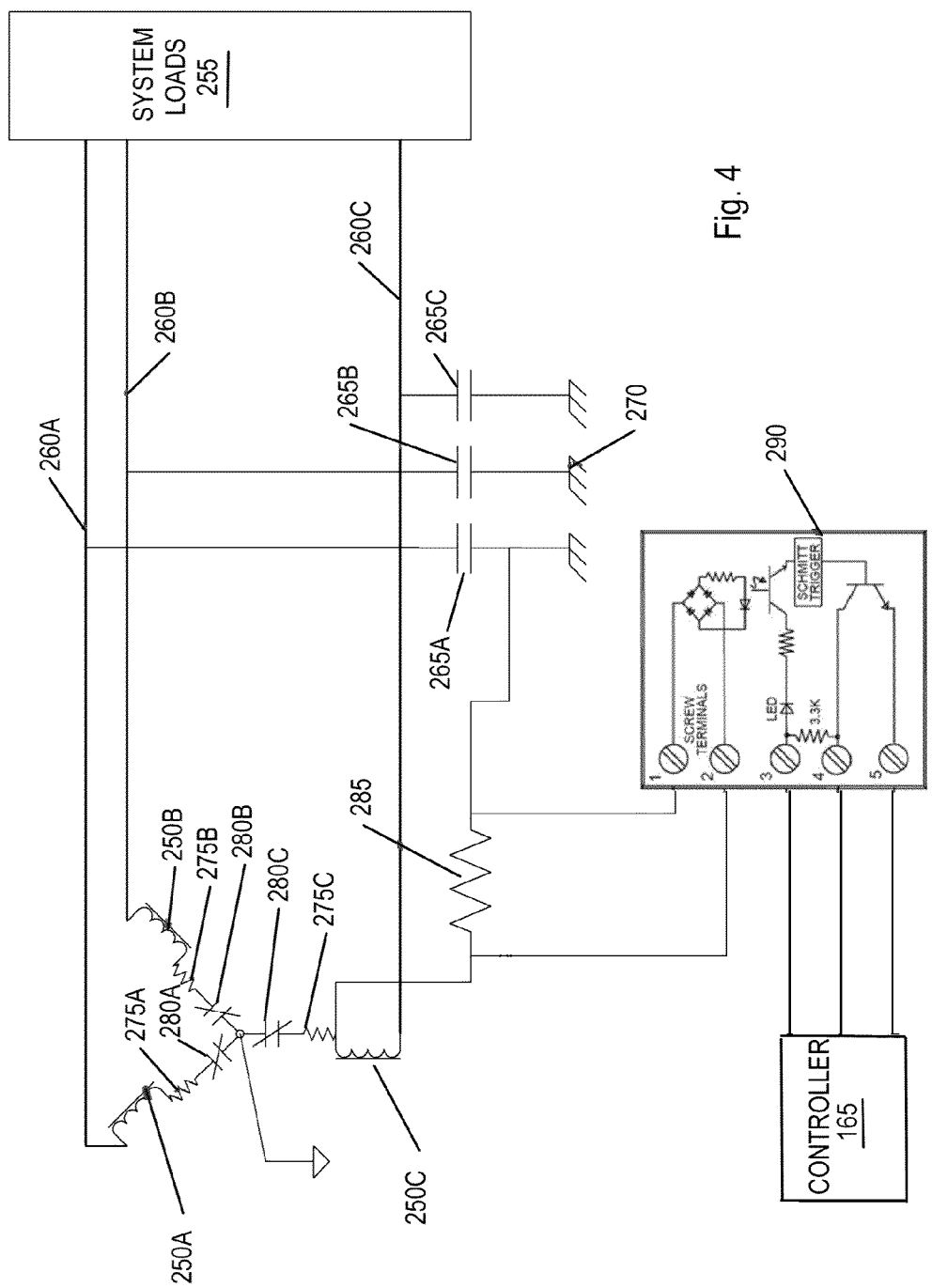
FIG. 4 is an electrical schematic of portions of the refrigeration unit of FIG. 2.

Turning now to FIG. 4, windings 250 of the alternator 127 are schematically represented. The windings 250 are configured in a wye configuration providing three phase electrical power. The electrical power from the windings 250 is provided to the system loads 255 either directly or indirectly, via the high-voltage AC bus 260. Also connected to each phase bus 260 is a respective system-phase-to-ground (SPG) capacitor 265. The capacitors 265 couple the high-voltage AC bus 260 to the chassis 270. Each SPG capacitor 265 can be a real capacitor having a capacitance greater than 470 pF. Alternatively, the capacitors 265 can represent parasitic capacitance developed between the high-voltage AC bus 260 and the chassis 270.

The alternator 127 can include small resistors 275 and normally-closed contacts 280 for each phase to provide a wye-point protector device for the alternator 127. However, the inclusion of these elements, 275 and 280, has a negligible effect on the neutral point of the phase windings 250. Therefore, the neutral point of the wye phase alternator is considered to be any electrical point electrically within the phase windings 250.

A high resistance ground (HRG) resistor 285 electrically couples the neutral point of the alternator 127 to the chassis 270. The resistor 285 includes a resistance value selected in a high resistance value range. The high resistance value range is set to sufficiently limit current in a phase-to-chassis fault event, while not being so high to not dissipate parasitic current during an intermittent phase-to-chassis fault. The HRG allows the system to operate during the fault, and protects against cascading failures.

For example, in a fault condition to not create a cascading failure, the resistance value should stay under the current ratings of the system components. The current ratings for a mobile application are typically 10A, but a value of 1 A may be used for a margin of safety. For intermittent fault conditions, the resistance value should be no greater than a value for the worst-case system charging current. For a mobile application the value can be approximately 53 pA. So for the exemplary mobile application, with a high-voltage AC bus range between 50V and 460V, the high-value resistance range would be between 200Ω and 4 MΩ. Further, the resistance value is typically preferred to be in the middle, but closer to the lower end of the range for providing greater user safety than equipment damage. So a preferred range may be between 1 kΩ and 1 MΩ, with a more preferred range being between 10 kΩ and 100 kΩ, and an even more preferred range being between 30 kΩ and 70 kΩ.

Referring again to FIG. 4, a solid-state module 290 monitors a voltage between the neutral point of the alternator 127 and the system chassis 270. As shown, the solid-state module 290 is electrically connected across the resistor 285. However, other connection points are possible. During a phase-to-chassis fault, the neutral-chassis voltage rises to match the phase-neutral voltage of the alternator 127. The solid state module detects this event and generates a signal in response. The signal can be an audio or visual signal, or can be an electrical signal provided to the controller 165, which can result in a shutdown of the alternator 127. An exemplary electrical schematic for the module 290 is shown in FIG. 4, which can be a Crydom solid-state relay module.

Accordingly, the invention provides a new and useful vehicle or environment-controlled unit having a multiphase alternator with a protected high-voltage bus. Various features and advantages of the invention are set forth in the following claims.

What is claimed is:

1. A mobile environment-controlled unit comprising:
   a chassis;
   a compartment supported by the chassis; and
   an environmental-control system supported by the chassis and in environmental communication with the compartment, the environmental-control system being configured to control an environmental parameter of the compartment, the environmental-control system including
      a multiphase alternator powered by an internal combustion engine and to supply electrical power for the environmental-control system, the alternator having phase windings and a neutral point for the phase windings;
      a high-resistance resistor electrically coupling the neutral point for the phase windings to the chassis; and
      a solid-state module electrically coupling the neutral point for the phase windings to the chassis, the module being configured to monitor a voltage from the neutral point to the system chassis, and to provide an output when the monitored voltage indicates a possible phase-to-structure fault.

2. The mobile environment-controlled unit of claim 1, wherein the environmental-control system further includes
   a controller configured to control the environmental-control system for affecting the environment of the compartment.

3. A mobile environment-controlled unit comprising:
   a chassis;
   a compartment supported by the chassis; and
   an environmental-control system supported by the chassis and in environmental communication with the compartment, the environmental-control system being configured to control an environmental parameter of the compartment, the environmental-control system including
      a multiphase alternator powered by an internal combustion engine and to supply electrical power for the environmental-control system, the alternator having phase windings and a neutral point for the phase windings; and
      a high-resistance resistor electrically coupling the neutral point for the phase windings to the chassis, wherein the high-resistance resistor has a value in a range sufficient to limit current in a possible phase-to-chassis fault and to dissipate parasitic current during a possible intermittent phase-to-chassis fault.

4. The mobile environment-controlled unit of claim 1, wherein the high-resistance resistor has a value between 1 kΩ and 1MΩ.

5. The mobile environment-controlled unit of claim 1, wherein the high-resistance resistor has a value between 10 kΩ and 100 kΩ.

6. The mobile environment-controlled unit of claim 1, wherein the high-resistance resistor has a value between 30 kΩ and 70 kΩ.

7. A mobile environment-controlled unit comprising:
   a chassis;
   a compartment supported by the chassis; and
   an environmental-control system supported by the chassis and in environmental communication with the compartment, the environmental-control system being configured to control an environmental parameter of the compartment, the environmental-control system including
      a multiphase alternator powered by an internal combustion engine and to supply electrical power for the environmental-control system, the alternator having phase windings and a neutral point for the phase windings; and
      a high-resistance resistor electrically coupling the neutral point for the phase windings to the chassis,
      wherein the alternator is a three-phase alternator with the phase windings configured in a wye arrangement, and wherein the neutral point is the center of the wye arrangement.

8. A vehicle comprising:
   a chassis;
   a multiphase alternator powered by an internal combustion engine and to supply electrical power for the environmental-control system, the alternator having phase windings and a neutral point for the phase windings;
   a high-resistance resistor electrically coupling the neutral point for the phase windings to the chassis; and
   a solid-state module electrically coupling the neutral point for the phase windings to the chassis, the module being configured to monitor a voltage related to the neutral point for the phase windings and the system chassis, and to provide an output when the monitored voltage indicates a possible phase-to-structure fault.

9. The vehicle of claim 8, and further comprising:
   a controller configured to control the environmental-control system for affecting the environment of the compartment.

10. The vehicle of claim 8, wherein the high-resistance resistor has a value in a range sufficient to limit current in a possible phase-to-chassis fault and to dissipate parasitic current during a possible intermittent phase-to-chassis fault.

11. The vehicle of claim 8, wherein the range of the high-resistance resistor is between 30 kΩ and 70 kΩ.

12. The vehicle of claim 8, wherein the alternator is a three-phase alternator with the phase windings configured in a wye arrangement, and wherein the neutral point is the center of the wye arrangement.

13. A mobile environment-controlled unit comprising:
   a chassis;
   a compartment supported by the chassis;
   an environmental-control system supported by the chassis and in environmental communication with the compartment, the environmental-control system being configured to control an environmental parameter of the compartment, the environmental-control system including an internal combustion engine;
a three-phase alternator to be powered by the internal combustion engine and to supply electrical power to the environmental-control system, the alternator having phase windings in a wye arrangement and a neutral point for the phase windings;
a high-resistance resistor electrically coupling the neutral point for the phase windings to the chassis, the high-resistance resistor having a value in a range sufficient to limit current in a possible phase-to-chassis fault and to dissipate parasitic current during a possible intermittent phase-to-chassis fault;
a solid-state module electrically coupling the neutral point for the phase windings to the chassis, the module being configured to monitor a voltage from the neutral point for the phase windings to the system chassis, and to provide an output when the monitored voltage indicates a possible phase-to-structure fault.

14. The mobile environment-controlled unit of claim 13, wherein the environmental-control system further includes
a controller configured to control the environmental-control system for affecting the environment of the compartment, to receive the output from the solid-state module, and to control the environment-control system based on the output.

15. The mobile environment-controlled unit of claim 13, wherein the range of the high-resistance resistor is between 30 kΩ and 70 kΩ.

\* \* \* \* \*